United States Patent Office 2,758,011
Patented Aug. 7, 1956

2,758,011

PRODUCTION OF ALUMINA

Herman S. Bloch, Chicago, Ill., assignor to Universal Oil Products Company, Chicago, Ill., a corporation of Delaware No Drawing. Application October 17, 1952,
Serial No. 315,412

3 Claims. (Cl. 23—143)

This invention relates to the preparation of alumina and more specifically to a method of preparing alumina by the interaction of water and metallic aluminum.

Alumina, either as the hydrate or the anhydrous form as aluminum oxide, is widely used in many chemical and petroleum industries. It has been employed in the petroleum industry as a catalyst for hydrocarbon conversion processes, as a support for catalytically active materials to be used in hydrocarbon conversion processes, and as a dehydrating agent. It is widely used in other chemical industries for the same purposes. The activated forms, which are considered to be merely various physical modifications of aluminum oxide, are especially known for their pronounced catalytic activity and adsorptive capacity. The use of alumina as a refractory is also well known. Alumina in the form of corundum has been found suitable for use in the manufacture of certain types of refractory and ceramic materials. In other uses alumina is mixed or compounded with other compounds to produce substances of desired properties.

It is an object of our invention to provide a new process for the production of alumina and further to produce high purity alumina.

Alumina or aluminum hydrate is present in various modifications. The more common types of anhydrous alumina are as follows:

Alpha-alumina, often known as corundum, is the form stable at temperatures over 1800° F.

Gamma-alumina is very stable but changes to alpha-alumina at temperatures above 1800° F.

Epsilon-alumina is the alumina formed in thin films on the surface of metallic aluminum during oxidation by dry or wet air or oxygen.

The following alumina hydrates or aluminum hydroxides are common or may be prepared in the laboratory.

Gamma-$Al_2O_3 \cdot 3H_2O$ or gibbsite is prepared by aging boehmite in a cold basic solution.

Alpha-$Al_2O_3 \cdot 3H_2O$ or bayerite is also formed by aging boehmite in a cold basic solution but is unstable and gradually is transformed into gibbsite.

Gamma-$Al_2O_3 \cdot H_2O$ or boehmite may be prepared in a variety of ways, one of the simplest being to add ammonium hydroxide to a water solution of aluminum chloride. The material originally precipitated is thought to be an amorphous alumina floc which rapidly grows in crystal size yielding crystalline boehmite. Aging of boehmite in ammonium hydroxide solution transforms the boehmite first to metastable bayerite and finally to the stable gibbsite.

Alpha-$Al_2O_3 \cdot H_2O$ or diaspore occurs abundantly in nature.

In the specification and claims the word alumina will mean one or more of these various modifications, either as anhydrous alumina or alumina hydrate or aluminum hydroxide unless otherwise specifically noted.

By varying the conditions of the process of this invention it will be shown that some of the various modifications of alumina as hereinbefore described may be obtained.

The usual commercial method of producing alumina is by purifying ores in which the oxide is present. Another method is by the precipitation of aluminum hydroxide from its salts, for example, by the addition of ammonia to an aqueous solution of aluminum sulfate. However, the physical form of the product produced in my process is much superior since it is crystalline and easily filterable, while the precipitated aluminum hydroxide is a gel and is filtered with difficulty.

I have now discovered and my invention broadly comprises an improved method of preparing alumina by reacting aluminum with water under specific conditions. Hydrogen in a very pure state is produced as a by-product of this reaction.

It is recognized that the art teaches the formation of alumina on the surface of aluminum upon exposure to dry or wet air or oxygen, however, it is always referred to as a protective coating of alumina which prevents the aluminum metal under this coating from being converted to the oxide. My invention, however, is such that a substantial amount, and in the more desirable aspect, the entire amount of aluminum is converted to the oxide. In the prior art the protective coating is taught to be of a tenacious nature in that it adheres rigidly to the aluminum metal while in my invention alumina is formed in such a state that it is easily separated from the reactants. In other embodiments all of the aluminum is converted to the oxide and it is only necessary to separate water therefrom which is easily done by filtering or heating. In other modes of operation where all of the aluminum is not converted to the oxide, the two solids occur substantially as distinct separate compounds not in any way adhered to or attached to each other and may thus be separated by any satisfactory means, such as centrifugal separation, flotation, etc. It is not necessary and, in fact, it is undesirable that the separation be effected by some cutting means, such as scraping or tumbling to remove the oxide from the surface of the metal since under the conditions of operation of my invention alumina is present, distinct and separate from the aluminum metal from which it is formed.

The aluminum to be used in my process can be any substantially pure aluminum, although if a high purity alumina product is desired it is preferable to start with high purity aluminum. It is also within the scope of this invention to use certain aluminum alloys; however, since the present process will produce a very pure alumina, it is a preferred embodiment of the present invention to react aluminum of preferably 99.5+% purity in water to produce a high purity alumina product. The presence of some alloying metals is undesirable, since they appear to inhibit the reaction of aluminum with water. For example, 2S aluminum, a structural type containing 1% iron, 0.2% manganese, 0.1% copper, 0.2% silicon, 0.05% gallium, 0.03% magnesium, 0.04% vanadium and 0.008% titanium is substantially inert to the action of water under the conditions herein disclosed. Another alloy containing 0.8% silicon and 0.2% iron, 0.2% manganese and 0.04% copper reacts partially, indicating that the latter metals exert a passivating effect.

The degree of subdivision of the aluminum is also another factor determining the rate of the reaction. The smaller the size of the particles, the greater the surface area of aluminum exposed to the water for reaction; a powdered aluminum is therefore excellent. Granulated or pelleted aluminum, or aluminum in ribbon form is also suitable, however, altho the larger the particle size of the aluminum metal charge the longer the time required for complete reaction. In general, pellicles of not more than about an inch in greatest dimension are satisfactory, altho those of less than about ½ inch average size are preferred.

The epsilon-alumina which forms rapidly on aluminum surfaces and acts as a coating which normally passivates aluminum does not effectively inhibit reaction under the conditions herein disclosed. Aluminum pellets prepared by dropping molten aluminum into water have proven to be very satisfactory for producing alumina by the process of my invention.

Another embodiment of the present invention is that the aluminum and water be sufficiently agitated so that the reaction to produce alumina proceeds at a desirable rate. The reaction is dependent upon the temperature of the reactants and at the same time is directly proportional to the degree of agitation given to the mixture. Thus a reaction that proceeds slowly at a temperature of 392° F. with only a mild agitation or rocking of the mixture will proceed very rapidly if the mixture is vigorously agitated. At a temperature of 572° F. the reaction proceeds quite rapidly even with a mild degree of agitation; however, if the mixture is subjected to vigorous agitation the time necessary for complete reaction is substantially decreased.

In one embodiment the present invention relates to a process for producing alumina which comprises reacting aluminum with water, agitating the mixture to form an alumina, maintaining a pressure sufficient to keep at least a portion of the water in contact with the aluminum in liquid phase and separately recovering alumina therefrom.

It is a feature of the present invention that liquid water be present and it is thus necessary, when temperatures above the boiling point of water are used, to effect the reaction under sufficient pressure to maintain a liquid phase of water. The critical temperature of water is 705.2° F., the definition of the critical temperature being that temperature above which a gas cannot be liquefied by pressure alone. Thus it is a particular feature of the present invention to maintain a temperature below about 705° F. and a pressure sufficient to maintain at least a portion of the water in liquid phase. Experiments conducted at temperatures near the critical temperature and at pressures sufficient to maintain water in the liquid phase have been entirely successful and the reaction proceeded at a very rapid rate.

If sufficient agitation is provided the reaction will proceed to a limited degree at a temperature of about 70° F., however, the amount of aluminum converted to alumina at this temperature is so low that it would not be a practical method for preparing alumina. The reaction does proceed satisfactorily at a temperature of approximately 250° F., and, therefore, the desired temperature range in which this process is effected is from about 250° F. to about 705° F.

Mention has already been made of the fact that the liquid phase of water is used and, therefore, the upper temperature limit that the reaction may proceed at is the critical temperature of water of 705.2° F. At a temperature of 70° F. and with vigorous stirring the reaction of aluminum with water to form alumina is not appreciably effected within 24 hours and, therefore, while it is possible to effect the reaction at this low temperature, from a practical standpoint it is more desirable to use higher temperatures.

The reaction performed at different conditions will produce various sizes of alumina crystals. The reaction between aluminum and water at high temperatures of above 600° F. will produce relatively large crystals which after drying appear to be rough enough to be used as an abrasive. The alumina produced by reacting aluminum with water at a temperature of from 400° F. to 500° F. produces a relatively fine product of approximately 10–15 micron average diameter. As hereinafter shown in the examples, if the reaction is effected at a temperature below the range of approximately 482° F. to 572° F. the reaction will produce gibbsite, while if the reaction is effected at a temperature above about 482° F. to 572° F. the alumina is produced as boehmite. The reaction may be effected in any suitable type of equipment wherein the reactants are subjected to agitation and preferably to vigorous agitation. If temperatures above the normal boiling point of water are employed it is necessary that the vessel be constructed so as to withstand pressure sufficient to maintain a liquid phase of water. For small scale production of alumina by this process, a rotating pressure bomb is satisfactory. If the temperatures employed are below the normal boiling point of water, the reaction may be effected in ordinary laboratory glass equipment in which a means is provided for vigorous agitation or mixing of the reagents. It is, however, necessary that the process equipment be constructed of such materials that it is not affected by the water or aluminum at the temperatures and pressures used so that undesirable elements are not introduced into the desired alumina product. However, if the presence of these foreign substances is not objectionable the above precautions need not be adhered to. It must be remembered that hydrogen is produced as a by-product of the reaction and a means of venting this hydrogen must be provided if the pressure build-up caused by the production of this hydrogen is to be avoided. If the equipment will withstand this additional pressure, however, it is not necessary to vent the hydrogen.

The following examples are given to illustrate my invention but are not given for the purpose of unduly limiting the generally broad scope of said invention.

*Example I*

18 grams of aluminum chips of ⅜ to ⅝ inch in diameter and 99.9+% purity and 200 grams of distilled water were placed in an Ipatieff-type rotating autoclave of 850 ml. capacity which was fitted with a Pyrex liner. The autoclave was then sealed and flushed with nitrogen after which it was heated to 572° F. The autoclave was maintained at this temperature and the bomb was rotated for approximately four hours after which time the bomb was cooled. An inspection and analyses showed that all of the aluminum reacted with the water to produce a white granular alumina product. The alumina product was dried at 230° F. for one hour and an analysis showed that the product was boehmite (gamma-$Al_2O_3 \cdot H_2O$) and upon calcination at 1200° F. gamma alumina of high quality and average small crystallite size of approximately 5–10 microns resulted.

*Example II*

The procedure of Example I was repeated but this time a temperature of 482° F. was maintained in the reaction zone. An inspection and analyses of the reaction product showed that in four hours 98% of the aluminum reacted with the water to produce a white granular alumina product which was identified as boehmite. It is thus seen that the temperature affects the rate of reaction of aluminum with water.

*Example III*

The procedure of Example I was repeated but this time at a temperature of 392° F. A very small reaction was noticed after four hours, the aluminum pellets being lightly coated with a deposit, presumably hydrated aluminum oxide. The results show that at a temperature of 392° F. and conditions of mild agitation as outlined above the reaction is extremely slow and would not be an attractive process for producing alumina.

*Example IV*

18 grams of aluminum chips of 99.9+% purity and 200 grams of distilled water were placed in a sealed flask which was provided with a high speed stirring device. The stirrer was passed through a seal in order that the flask might be subjected to pressure. The aluminum and the water were heated to 303° F. and the high speed stirrer turned on. In four hours time all of the aluminum reacted with the water to produce alumina and hydrogen, both in a very pure state. An examination of the product showed that the product of this reaction was gibbsite (gamma-$Al_2O_3 \cdot 3H_2O$). This experiment shows that at temperatures of 392° F. as used in Example III the reaction can be satisfactorily effected if sufficient stirring is provided, since at a temperature below this, at 303° F. as used in this experiment it was possible to effect the reaction. It is also shown that at a temperature of 303° F., gibbsite is produced while if the reaction is effected at a temperature of 482° F., the alumina is produced as boehmite.

I claim as my invention:

1. A process for producing alumina in the form of boehmite which comprises commingling water with metallic aluminum in the form of subdivided solid particles, heating the mixture to a temperature of at least 482° to about 705° F. at a sufficient pressure to maintain a liquid phase of water, and agitating the mixture at said temperature and pressure for a sufficient time to react substantial portions of the aluminum and water.

2. A process for producing alumina in the form of boehmite which comprises commingling water with aluminum particles of not more than about an inch in greatest dimension, heating the mixture to a temperature of at least 482° to about 705° F. at a sufficient pressure to maintain a liquid phase of water, and agitating the mixture at said temperature and pressure for a sufficient time to react substantially all of the aluminum with the water.

3. A process for producing alumina in the form of boehmite which comprises commingling water with aluminum pellets of not more than about ½ inch average size, heating the mixture to a temperature of at least 482° to about 705° F. at a sufficient pressure to maintain a liquid phase of water, maintaining the mixture at said temperature and pressure until substantially all of the aluminum has been reacted with the water, and simultaneously agitating the mixture with sufficient vigor to complete said reaction within a period of time not substantially in excess of about 4 hours.

References Cited in the file of this patent
UNITED STATES PATENTS

| | | |
|---|---|---|
| 738,398 | Besson | Sept. 8, 1903 |
| 1,305,702 | Ehlert | June 3, 1919 |
| 1,648,262 | Frost | Nov. 8, 1927 |

OTHER REFERENCES

McPherson and Henderson: "A Course in General Chemistry," third ed., pages 299–309 inclusive. Ginn and Co., N. Y.

Jones: "Inorganic Chemistry," 1947 ed., page 176. Blakiston Co., Philadelphia.

Mellor's: "Modern Inorganic Chemistry," single vol. ed., 8th ed. revised, January 1935, page 774. Longmans, Green and Co., N. Y.

Mellor's: "Inorg. and Theoretical Chem." vol. 5, page 205, Longmans, Green and Co., N. Y.